(12) United States Patent
Facius

(10) Patent No.: US 7,359,119 B2
(45) Date of Patent: Apr. 15, 2008

(54) OPTICAL ARRANGEMENT FOR PRE-PROCESSING PRIMARY ILLUMINATION LIGHT

(75) Inventor: Zoltan Facius, Waiblingen (DE)

(73) Assignee: SONY Deutschland GmbH, Cologne (DE)

( * ) Notice: Subject to any disclaimer, the term of this patent is extended or adjusted under 35 U.S.C. 154(b) by 141 days.

(21) Appl. No.: 11/170,965

(22) Filed: Jun. 30, 2005

(65) Prior Publication Data

US 2006/0001970 A1    Jan. 5, 2006

(30) Foreign Application Priority Data

Jul. 2, 2004    (EP) .................................. 04015679

(51) Int. Cl.
*G02B 27/28* (2006.01)
(52) U.S. Cl. ............... 359/496; 359/495; 359/497; 359/834; 353/20; 362/19; 362/339
(58) Field of Classification Search ................ 359/496, 359/497
See application file for complete search history.

(56) References Cited

U.S. PATENT DOCUMENTS

| | | | |
|---|---|---|---|
| 5,221,982 A | 6/1993 | Faris | |
| 6,130,728 A | 10/2000 | Tsujikawa et al. | |
| 6,151,166 A | 11/2000 | Matsushita et al. | |
| 6,327,093 B1 | 12/2001 | Nakanishi et al. | |
| 6,332,684 B1* | 12/2001 | Shibatani et al. | 353/31 |
| 6,344,927 B1 | 2/2002 | Itoh et al. | |
| 2003/0043348 A1 | 3/2003 | Ito | 353/31 |

FOREIGN PATENT DOCUMENTS

| | | |
|---|---|---|
| EP | 1 043 620 | 10/2000 |
| EP | 1 298 939 | 4/2003 |

\* cited by examiner

*Primary Examiner*—Stephone B. Allen
*Assistant Examiner*—Lee Fineman
(74) *Attorney, Agent, or Firm*—Oblon, Spivak, McClelland, Maier & Neustadt, P.C.

(57) ABSTRACT

An optical arrangement for pre-processing primary illumination light is proposed, wherein a provided spectral processing section (P) comprises a multi-prism assembly (10) consisting of a plurality of sequentially/consecutively connected prisms (21, 22). Pairs (20) of adjacent and connected prisms (21, 22) form a respective spectral separating face (20c). The spectral separating face (20c) is adapted in order to perform a process of spectral separation/splitting with respect to said primary illumination light (L1).

24 Claims, 10 Drawing Sheets

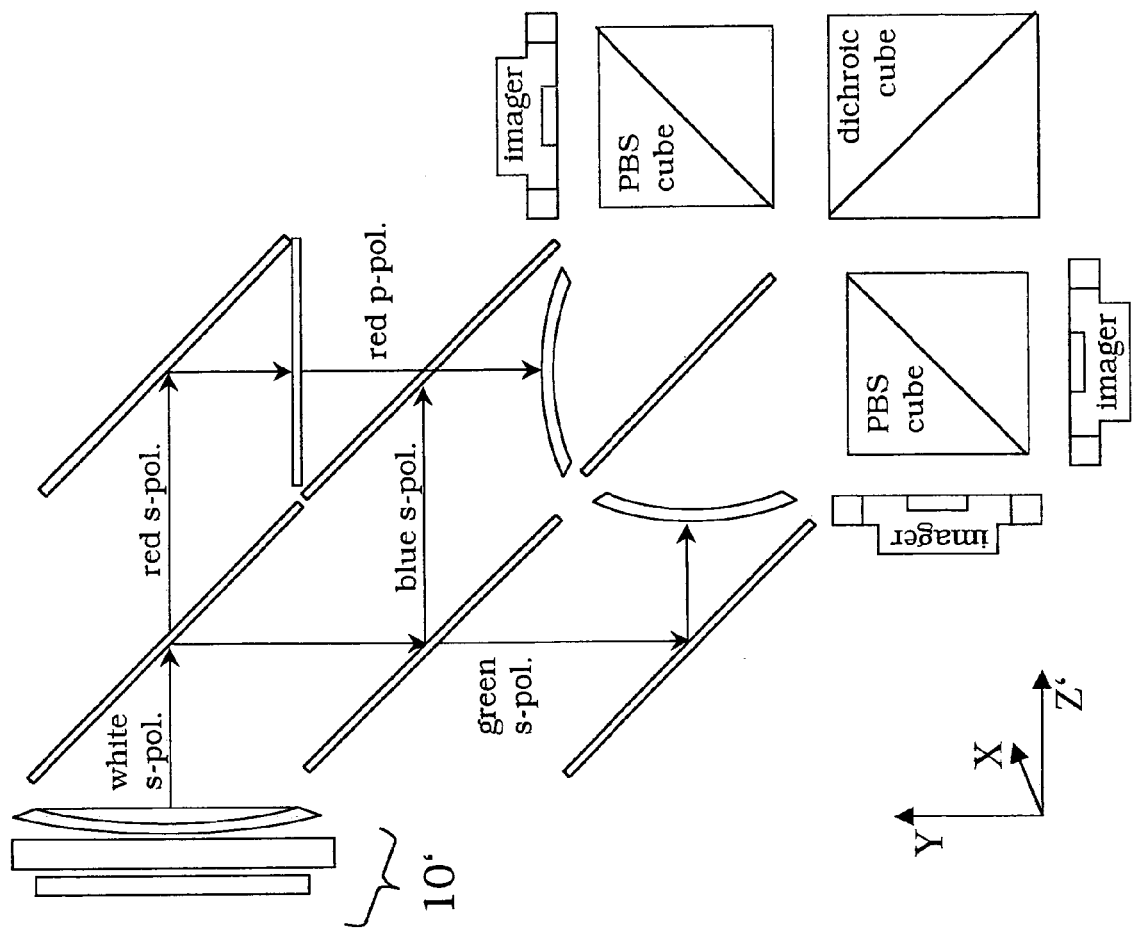
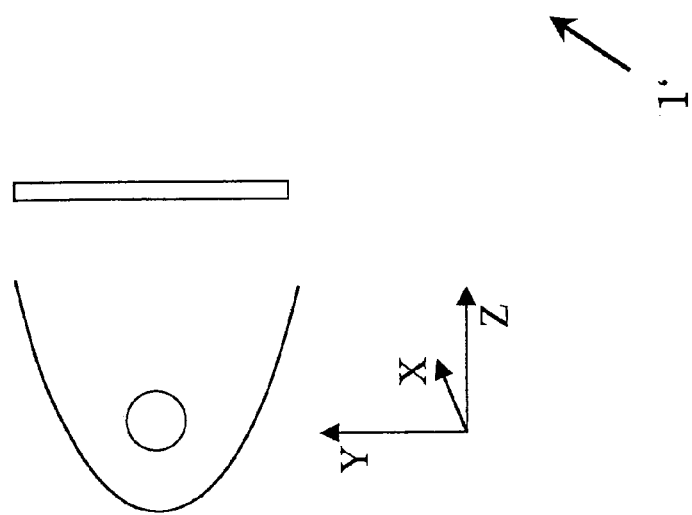
Prior Art / Example
Fig. 5

OPTICAL ARRANGEMENT FOR PRE-PROCESSING PRIMARY ILLUMINATION LIGHT

The present invention relates to an optical arrangement for pre-processing primary illumination light and in particular to an optical arrangement being or comprising an assembly of a multiplicity of dichroic prisms or a multiple dichroic prism assembly (MDP) as a spectral processing section which in particular realize a wavelength specific polarization management.

In many optical systems and in particular in LCD projectors optical arrangements are necessary to pre-process provided primary illumination light. The pre-processing might consist of a sub-process of splitting up the received primary illumination light in complementary parts with respect to the spectral and/or polarization properties.

However, known concepts for instance for colour selective filter units might have a good performance with respect to the colour selectivity but they are not suitable with respect to their light output and/or with respect to their stability during operation as the operation of projection systems in most cases lead to certain temperature arises.

It is an object of the present invention to provide an optical arrangement which has a good colour-polarization selection performance at low light losses and with a high temperature stability and temperature robustness.

The inventive optical arrangement for pre-processing primary illumination light comprises a light entrance section, a light output section, as well as a spectral processing section. The light entrance section is adapted and/or arranged for receiving primary illumination light which is transmitted in and received from an incoming direction. The light output section is arranged and/or adapted for outputting output light as secondary illumination light in an irradiating direction. The provided spectral processing section is adapted and/or arranged between said light entrance section and said light output section in order to spectrally process said primary illumination light and in order to generate said second illumination light.

The spectral processing section comprises a multi-prism assembly which consists of a plurality of sequentially and/or consecutively connected prisms. Pairs of adjacent and connected prisms form a respective spectral separating face or interface at—in particular diagonal or hypotenuse—faces thereof forming a connecting interface between them. Said spectral separating face is adapted and/or arranged in order to perform a process of spectral separation and/or splitting with respect to said primary illumination light or a derivative thereof, in order to generate said secondary illumination or a pre-form thereof, and in particular in order to thereby generate first and second parts or types of said secondary illumination light or pre-forms thereof which are spectrally separated and have or belong to essentially different and/or essentially complementary spectral wavebands or spectral components and which at the same time remain or are essentially spatially mingled or essentially spatially non-separated.

It is—in other words—in particular an issue of the present invention to generate from primary illumination light L1 two types L2-1 and L2-2 of secondary illumination light L2. The difference between the two types L2-1 and L2-2 of secondary illumination light L2 consist of their different spectral wavebands and further in particular their different polarization states.

First L2-1 and L2-2 have complementary spectral wavebands of light, for example red-cyan, blue-yellow, green-magenta, constituting a pair producing a neutral color. The first task of the inventive multi-dichroic prism assembly is two separate these different wavebands from another.

On the second hand the two complementary wavebands are given linear polarization states which are perpendicular with respect to each other. For example: The blue light will become s-polarized light. The yellow light will become p-polarized light.

It is possible to change the polarization states between the colours depending on the configuration of the illumination system which follows in the optical path and arrangement.

The benefit of the system is to give a part of a waveband a certain polarization state without increasing the arrangement's size or the number of components of the system. In existing illumination systems after the respective lens array 2 and the polarization converter only white light exists in one linear polarized state, i.e. either in a p polarized or in a s polarized polarized polarization state.

The difference of reducing the amount of components and the size of the illumination system is shown in FIGS. 5 and 6. In accordance to the inventive configuration one has linear polarized light of two states where each state has is own spectral waveband or colour.

For projection systems using polarization sensitive imagers like LCD projectors. It is a major benefit regarding size and complexity to have light, which is already separated with respect to their polarization state and their colour at this point of the illumination part but without being separated spatially. Both states are existing in parallel to the z-direction in the same illumination light bundle.

Polarization or colour sensitive parts depending on the architecture of the system can later separate the light spatially. This circumstance gives also more degrees of freedom for the optical design of projection engines.

According to a preferred embodiment of the inventive optical arrangement said plurality of prisms or a part thereof forms a receiving face which is oriented essentially towards the mentioned in coming direction. Additionally or alternatively, said plurality of prisms or a part thereof forms an irradiating face which is oriented essentially in said irradiating direction.

According to a further additional or alternative embodiment said pairs of adjacent and connected prisms form a cubic structure or a square structure which is meant to be the structure of a cuboid or right parallelepiped.

Advantageously, a dichroic mirror may be positioned between the prisms of a pair of prisms. Thereby a spectral separating face as mentioned above is formed. Said dichroic mirror may be adapted for reflecting light off or within a first spectral waveband. Additionally, said dichroic mirror may be adapted for transmitting light off or within a second spectral waveband. Further on, said second spectral waveband may be essentially complementary and/or non-overlapping with respect to said first spectral waveband.

In this case, said optical arrangement may in accordance with a further preferred embodiment of the present invention comprise a half wave or $\lambda/2$ retarder, in particular with a 45° orientation and being adapted for adapting a polarization state for said reflected light and/or for said transmitted light and in particular in order to thereby prepare said first and second parts or types of said secondary illumination light or said pre-forms thereof to be additionally separated with respect to their polarization state and to additionally have or belong to essentially different and/or essentially complementary polarizations states—in particular to a first or s polarized polarization state and to a second or p polarized polarization state—and at the same time to remain or to be essentially spatially mingled or essentially spatially non-separated.

In accordance with a further preferred embodiment of the inventive optical arrangement may be of right triangular shape and/or said spectral separating face may be formed by the hypotenuse faces of two adjacent and connect prisms of a pair of prisms.

In this case it may be of further advantage to arrange said $\lambda/2$ retarder on or adjacent to a secant face of said prism. Additionally, said secant face may be oriented parallely with respect to said incoming direction and/or with respect to said irradiating direction. Said $\lambda/2$ retarder is in particular adapted and/or arranged in order to thereby prepare said first and second parts or types of said secondary illumination light or said pre-forms thereof to be additionally separated with respect to their polarization state and to additionally have or belong to essentially different and/or essentially complementary polarizations states—in particular to a first or s polarized polarization state and to a second or p polarized polarization state—and at the same time to remain or to be essentially spatially mingled or essentially spatially non-separated.

As an alternative said prisms of a pair of prisms may be of rhomboidal shape wherein a first pair of parallel faces of said prisms forms a 45° angle with respect to said incoming direction and wherein a second pair of parallel faces of said prisms is arranged in a direction perpendicular to said incoming direction. Additionally a dichroic mirror may be arranged between the faces of said first pair of adjacent and connected prisms in order to thereby realize the spectral splitting interface.

In this case the face which is oriented towards the light output section of said second pair of parallel faces may be coated with a $\lambda/2$ retarder having a 45° orientation said $\lambda/2$ retarder in particular adapted and/or arranged in order to thereby prepare said first and second parts or types of said secondary illumination light or said pre-forms thereof to be additionally separated with respect to their polarization state and to additionally have or belong to essentially different and/or essentially complementary polarizations states—in particular to a first or s polarized polarization state and to a second or p polarized polarization state—and at the same time to remain or to be essentially spatially mingled or essentially spatially non-separated.

According to a further alternative embodiment the inventive optical arrangement may comprise as a part of said spectral processing section a polarizing or polarization converting system.

This polarization or polarizing converting system may be arranged and/or provided between said light entrance section and said spectral processing section.

Alternatively, said polarizing or polarization converting system may be arranged and/or positioned between said second processing section and said light output section.

According to a further preferred embodiment of the inventive optical arrangement said plurality of prisms and/or of said pairs of prisms of said multi-prism assembly or said multi-prism assembly itself may comprise or form an arrangement which extends essentially in one direction which is essentially perpendicular to said incoming direction. Additionally the respective plurality or assembly itself may be formed in the form of a bar.

Alternatively said plurality of prisms and/or of said pairs of prisms of said multi-prism assembly or said multi-prism assembly itself may be, comprise or form an arrangement which extends essentially in two directions which are in each case essentially perpendicular to said incoming direction and which are in each case essentially perpendicular with respect to each other. The respective plurality or the assembly itself may be arranged and formed as a two-dimensional plate or plane.

According to a preferred embodiment of the present invention in said pair of prisms a first prism is provided which is arranged and/or adapted in order to receive said primary illumination light or a derivative thereof.

To realize this functionality said first prism may comprise a first face which is arranged and/or adapted in order to receive said primary illumination light or a derivative thereof and which is in particular oriented essentially perpendicularly with respect to said light incoming direction.

According to a further alternative or additional embodiment said first prism may comprise a second face which is adapted and/or arranged for having light off or within said first spectral waveband left said first prism an particular towards an adjacent pair of prisms and further in particular towards a second prism of said pair of prisms and further in particular for entering the same through a first face of said second prism of said adjacent pair of prisms.

According to a further preferred embodiment of the inventive optical arrangement said first prism comprises a third face which is arranged and/or adapted in order to receive light of said first spectral waveband or a derivative thereof and to reflect said received light of said second waveband or a derivative thereof in particular from said first face to said second face of said first prism.

Additionally or alternatively the third face of the first prism may be arranged and/or adapted in order to receive light of said second spectral waveband or a derivative thereof and to transmit said received light of said second waveband or a derivative thereof in particular from said first face of said first prism to said third face of said second prism of said pair of prisms and further in particular for entering said second prism of said pair of prisms in particular through said third face of said second prism.

A particular simple form of the first prism may be achieved according to a preferred embodiment of the present invention according to which said first face of said first prism is oriented essentially perpendicular with respect to said incoming direction and/or in particular as a secant face. Additionally or alternatively said second face of said first prism may be oriented in a direction essentially parallely to said incoming direction and in particular a secant face. Further additionally or alternatively, said third face of said first prism may be a diagonal face connecting said first face and second face of said first prism in particular as a hypotenuse face.

Said pair of prisms may also comprise a second prism which is adapted and/or arranged in order to receive light off or within said first spectral waveband or a derivative thereof, in particular from an adjacent pair of prisms and further in particular from a second face of a first prism of said adjacent pair of prisms.

Additionally or alternatively, said second prism may be adapted and/or arranged to receive light off or within said second spectral waveband or a derivative thereof, in particular from said first prism of said pair of prisms and further in particular from said third face of said first prism of said pair of prisms.

It is of particular advantage to have as a part of said second prism of said pair of prisms with a first face which is adapted and/or arranged in order to receive and thereby having entered light off or within said first spectral waveband or a derivative thereof in particular from an adjacent pair of prisms and further in particular from a second face of a first prism of said adjacent pair of prisms. Additionally or alternatively said first face of said second prism of said pair of prisms may be oriented essential in parallel with respect to said incoming direction and/or with respect to said irradiating direction.

According to a further advantageous embodiment of the inventive optical arrangement said second prism may comprise a second face which is adapted and/or arranged for having light left said second prism in particular essentially in the irradiating direction and/or in particular within or of said second waveband.

According to a further advantageous embodiment of the present invention the second prism comprises a third face which is adapted and/or arranged in order to receive light off or within said first spectral waveband or a derivative thereof and to reflect light of a p-polarized polarization state in particular from said first face of said second prism to said second face of said second prism. Additionally or alternatively said third face of said second prism is adapted and/or arranged in order to transmit light of a s-polarized polarization state.

Further additionally or alternatively said third face of said second prism may be arranged and/or adapted in order to receive light of or within said second spectral waveband or a derivative thereof and to transmit the same to the second face of the second prism.

These and further aspects of the present invention will be elucidated by the following remarks:

The invention is or comprises e.g. an assembly of 90° prisms as indicated by some of the preferred embodiments below. The assembly of 90° prisms can be used in projection systems for LCD Projectors. This assembly is adapted in order to split the incoming light in to two parts, i.e. a first and second spectral part which are complementary with respect to each and/or which are essentially non-overlapping. The first spectral part e.g. changes its polarization state complementary to the second part.

Outgoing light is divided in to two spectral wavebands and the polarization states of the wavebands are separated into s- or p-linear polarized light.

For Example, incoming white linear polarized light is split in to a blue and a yellow part. Where the polarization stage of the blue light is changed, so that blue have linear polarized light with a 180° phase shift compared to yellow.

In a first prior art solution, a similar functionality can be achieved by a system which uses a plurality of e.g. 20 to 30 stacked retarder foils, e.g. of a polymer. The company Colorlink is producing these kind of filters under the trademark of color select filter™.

The filter works with linear polarized light. A drawback are its comparable low temperature stability, its comparable low resistance against UV radiation and/or against deep blue light and its comparable low transmission efficiency.

A second prior art solution is or comprises an arrangement of 45° dichroic mirrors and a half wave retarder in the illumination part of the system. This is demonstrated for instance in FIG. 4. In this arrangement the illumination system requires much more space compared to the solution by the invention and the optical path of light becomes long.

An advantage of the invention is its insensitivity regarding temperature and higher transmission compared to the colour select filter.

Above-mentioned colour select filter™ (first prior art solution) have good performance but are not suitable for high temperatures almost present in projection systems. Further the amount of stacks reduces the transmission of light that why the efficiency is limited.

Above-mentioned system with an arrangement of 45° dichroic mirrors, i.e. the second prior art solution, is too large in space and requires to much space also for the optical path of the illumination system as it becomes longer.

The invention solves the following problems:
Large size of illumination system
Temperature stability
Deep Blue light resistance
Transmission efficiency
F/# number dependency on wavelength selective polarization FIGS. 3 and 7 show the mentioned assembly of 90° triangular shaped prisms according to a first embodiment of the invention. Every second single prism is coated with a dichroic mirror coating on the surface along the hypotenuse of the triangular or triangle prism. These prisms are glued together couple-wise with prisms of the same shape, which do not have such kind of coating. Now we have quadratic shaped prism assemblies. The next step is to stack the retarder on one side of each quadratic prism (refer to FIG. 7).

These prisms are positioned/adapted to conventional illumination system requiring linear polarized light.

A conventional design with lens array light integration system is the base for using the multi-dichroic prism assembly.

FIG. 1 shows the schematic view of the assembly according to the first embodiment consisting of lamp with parabolic reflector, first lens array, polarizing-converting-system (PCS), second lens array and Multi-DC-Prism. Apart from the inventive Multi-DC-Prism assembly this illumination system is state of the art and used in current projectors.

The collimated light bundle coming from lamp is focused by the first lens array onto the second lens array. Before reaching the second lens array the light is separated into p- and s-polarized light by the polarizing beam splitting prism (polarizing conversion system). After the light splitting one of the polarization states can be changed from s- to p-polarized light or from p- to s-polarized light. Anyway after the PCS the white light (lambda 1) is linear polarized. After passing lens array 2 the linear polarized light lambda 1 will be split by the dichroic prisms in to two-waveband lambda 2 and lambda 3. Where lambda 3 is transmitted and the dichroic mirror reflects lambda 2. Transmitted waveband lambda 3 is guided without changing it polarization stage. The dichroic mirrors reflect lambda 2 two times. After first reflection a half wave retarder is positioned between the prisms to change the polarization stage of lambda 2. A second reflection guides the light towards the illumination system.

FIG. 2 shows a second embodiment of the invention with the same functionality. The components are slightly different regarding the alignment and the sub-structure.

The second embodiment consists of a parabolic reflector, first lens array, Multi DC Prism, second lens array and polarizing converting system PCS. Compared to the first setup the position of Multi DC Prism and polarizing converting system PCS is changed. Further the sub-structure of the Multi-DC-Prism assembly is the same as the polarizing converting system PCS excluding the coating. The grid in front of the Multi-DC-Prism avoids light going in to the wrong prism side. This working principle is vice versa to the above-mentioned system. First the light is split into two wavebands lambda 2 and lambda 3. Both wavebands are still un-polarized. Afterwards, passing the second lens array, the PCS generates linear polarized light for both wavebands, where the polarization vectors of the wavebands are orthogonal to each other.

The dichroic prism splits light coming from the first lens array into two wavebands. Where lambda 2 is reflected and lambda 3 is transmitted by the dichroic mirror. After passing the lens array lambda 3 will reach prism 1 of the PCS and lambda 2 will reach prism 2 of the PCS. Here lambda 2 and lambda 3 will split in to s- and p-polarized components. By the following scheme (see FIG. 2) lambda 2's transmitted part is p-polarized. Also lambda 3 transmitted parts is p-polarized.

Both reflected parts of lambda 2 and 3 are s-polarized. Due to the prism arrangement you will have on each prism both waveband with different polarization direction, alternatively changing from prism to prism. Putting in front of each second prism a half-wave retarder in 45° alignment for turning the polarization direction about 90°, will occur that all lambda 2 component have the same polarization stage and where all lambda 3 components will have the same polarization stage which is complementary to lambda 2.

Colour management and polarization management can be integrated in one system without using too advanced manufacturing techniques. No advanced laminating processes are required, which is necessary for manufacturing of colour selective filter from retarder-sheets. Further possible advantages are:
  Independency of polarization and colour selection efficiency from the F/# number (figure for steepness of angles in the illumination system)
  High transmission efficiency
  Easy manufacturing process
  Temperature insensitivity
  More stability regarding deep blue light below 430 nm In the following the present invention will be elucidated in more detail on the basis of preferred embodiments thereof taking reference to the accompanying Figures.

FIGS. 4, 5 are schematical views elucidating prior art systems.

FIGS. 7A-E are cross-sectional side view for elucidating an assembly process for the present invention.

Figure 8:
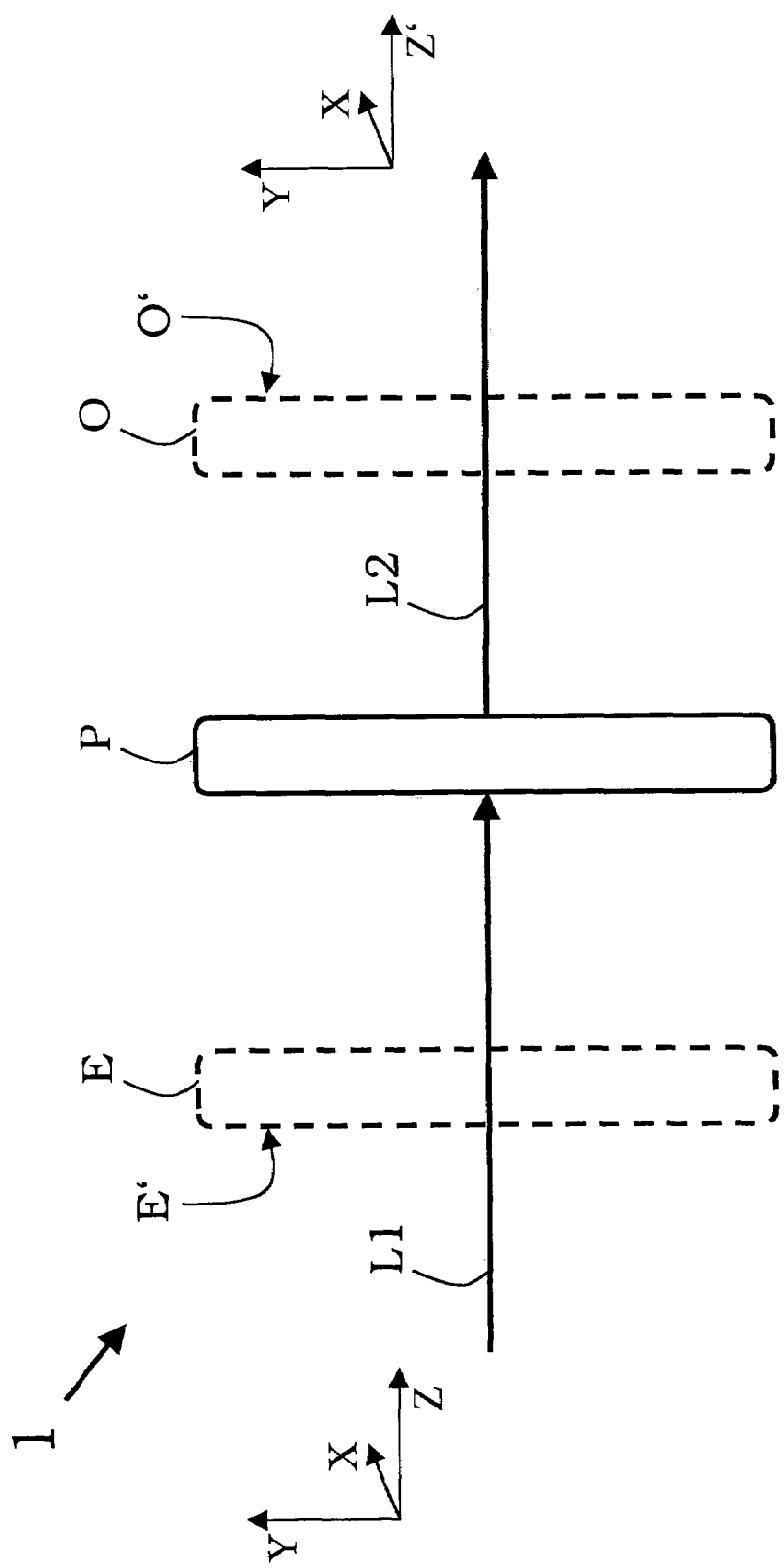

FIG. 8 is a schematical and cross-sectional side view elucidating further the principle of the present invention.

Figure 9A:
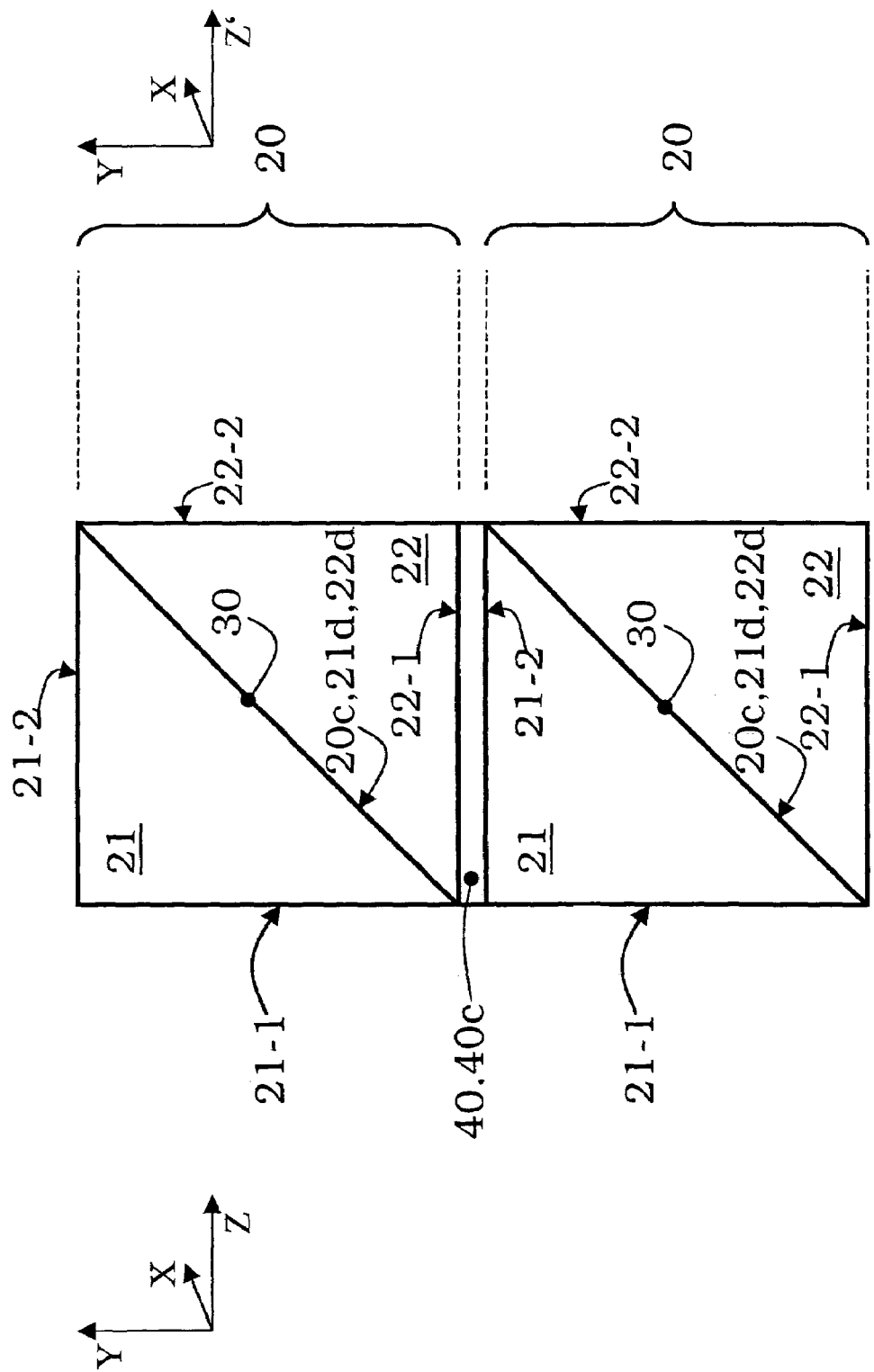
Figure 9B:
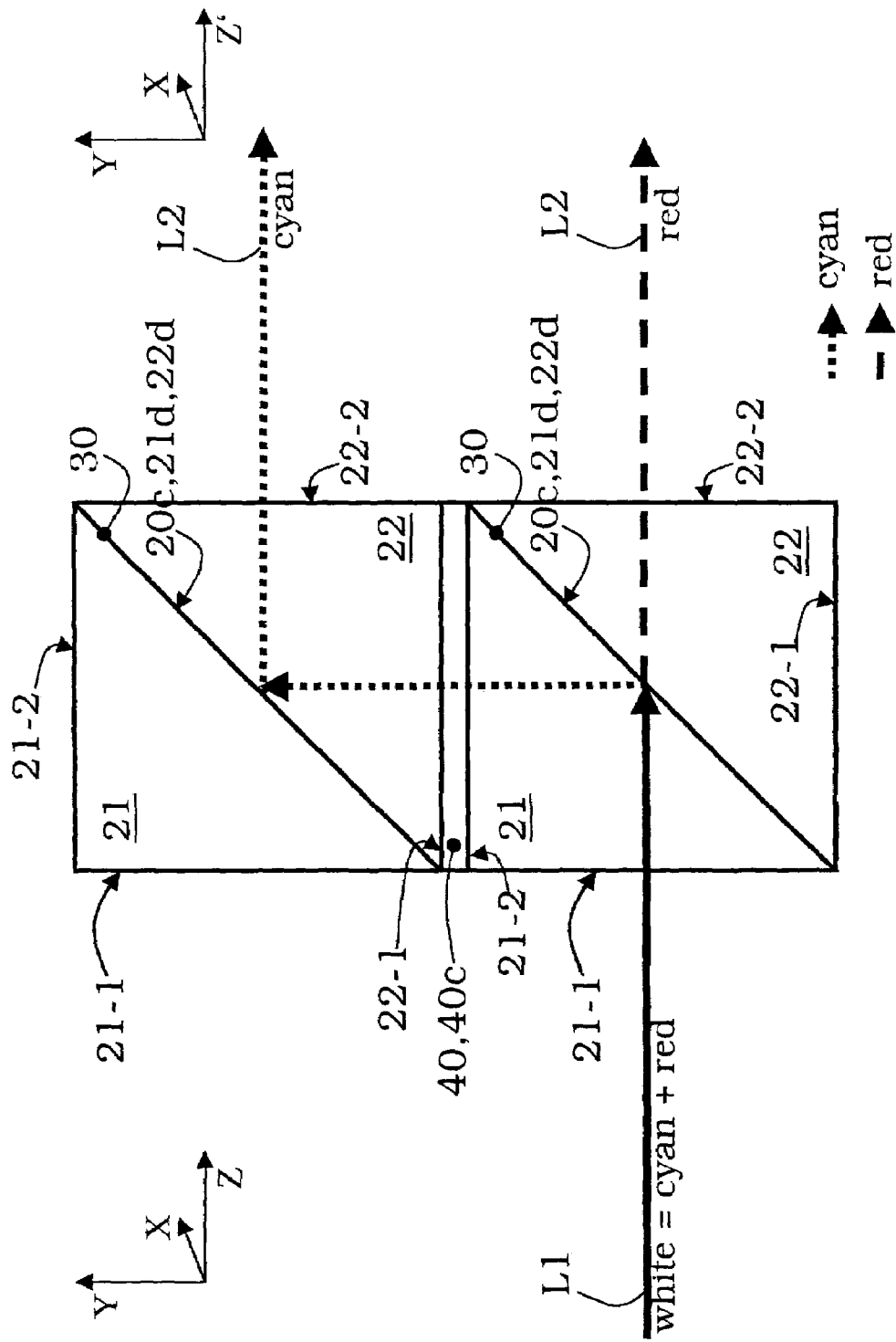

FIGS. 9A, 9B are cross-sectional side views for elucidating the working principle of the present invention.

In the following elements which are equivalent or similar with respect to the structure or their functionality are denoted by the same reference symbols. Not in each case of their occurrence their structure and functionalities are explained in detail.

Figure 1:
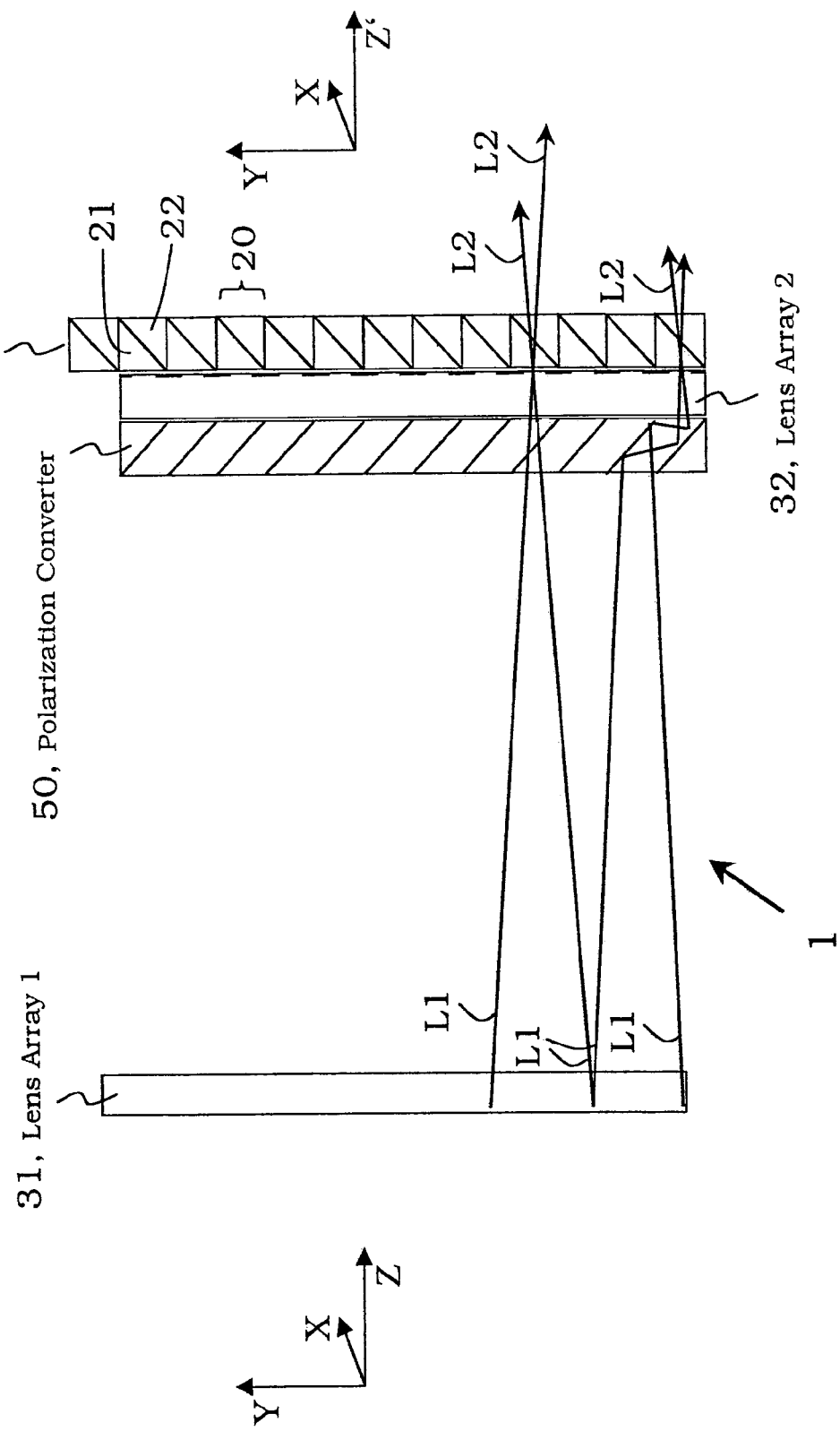
FIG. 1 is a schematical and cross-sectional side view of a first embodiment of the present invention.

FIG. 1 is a schematical and cross-sectional side view of a first embodiment of the inventive optical arrangement 1. It comprises therefore as a spectral processing section P a multi-dichroic prism assembly 10 having λ/2 retarder units. The multi-dichroic prism assembly 10 has a bar-like, i.e. a 1-dimensional structure or a plate-like structure, i.e. a 2-dimensional structure built up by pairs 20 of first and second prisms 21 and 22.

Primary illumination light L1 is input from input or incoming direction Z via a first lens array 31, a polarization converter 50 and a second lens array 32 which are arranged at the light incidence side of the multi-dichroic prism assembly 10. After pre-processing the incident primary illumination light L1 by said spectral processing section P in the sense of the inventive multi-dichroic prism assembly 10 secondary illumination light L2 leaves the spectral processing section P, i.e. the multi-dichroic prism assembly 10 in an irradiating direction Z' which is in this case essentially identical to the incoming direction Z.

Figure 2:
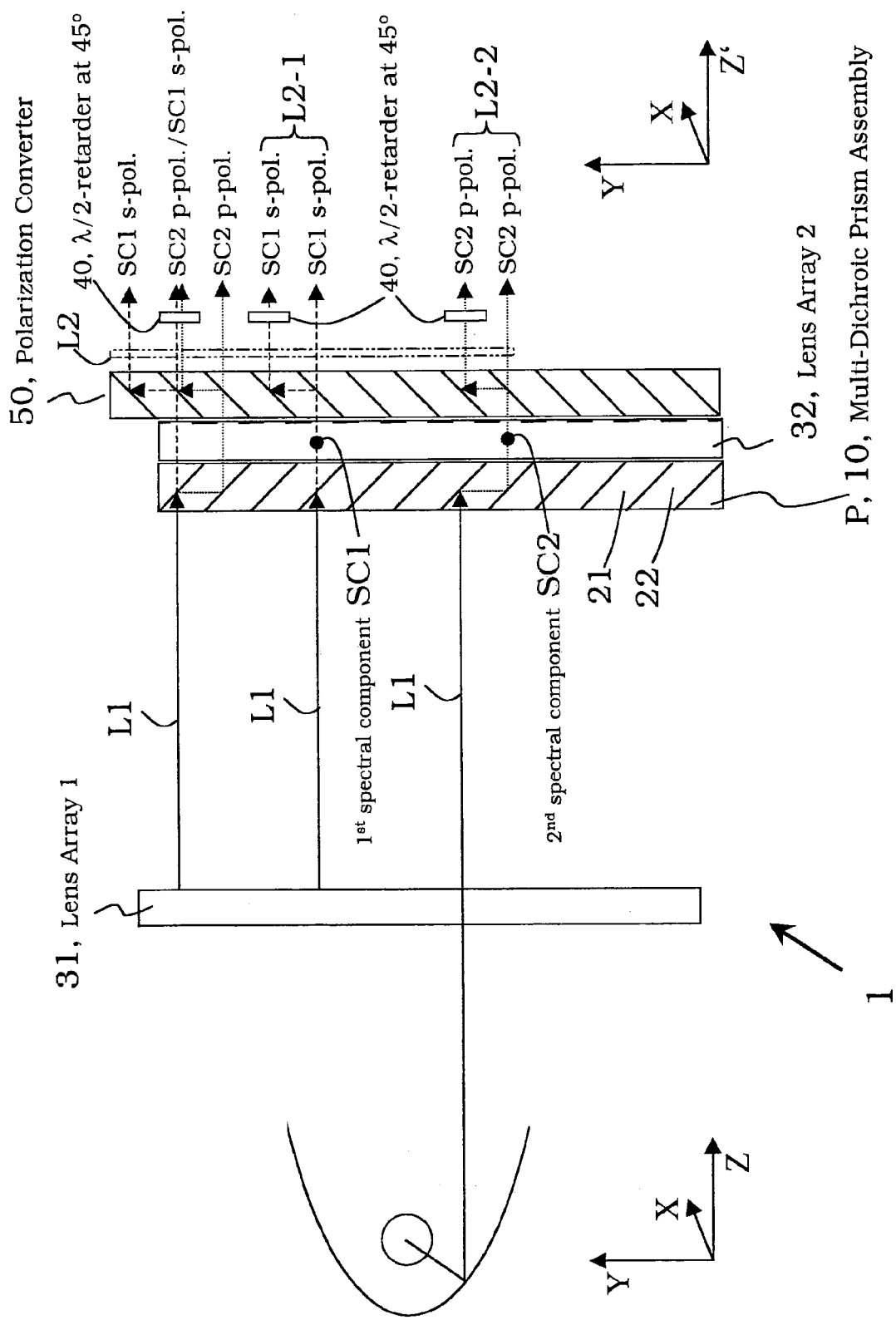
FIG. 2 is a schematical and cross-sectional side view of another preferred embodiment of the present invention.

The embodiment of the inventive optical arrangement 1 shown in FIG. 2 is similar to the optical arrangement shown in FIG. 1 with the following particularities. The embodiment shown in FIG. 2 comprises as a spectral processing section P a multi-dichroic prism assembly in which the prisms 21 and 22 of the pairs 20 of adjacent and connected prisms 21 and 22 have a structure on the basis of a parallelepiped or rhomboid whereas in the embodiment of FIG. 1 the prisms 21 and 22 are based on a triangle. In addition, λ/2 retarder units 40 are provided behind each second dichroic prism in order to convert the respective polarization state.

Figure 3:
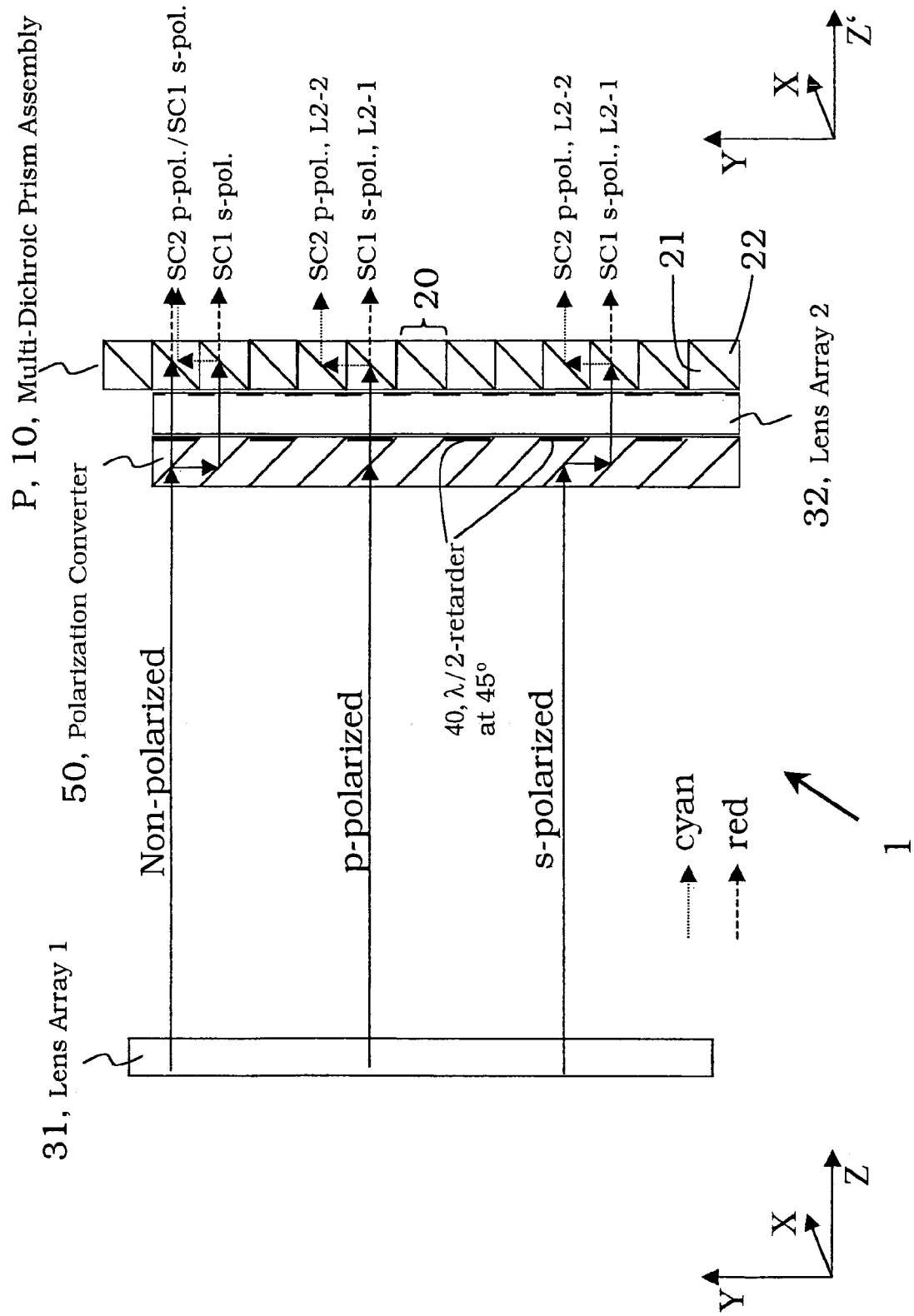
FIG. 3 is a cross-sectional side view of a preferred embodiment of the present invention for elucidating the working principle of the present invention.

FIG. 3 is a cross-sectional and schematical side view of the embodiment shown in FIG. 1 wherein the optical paths for non-polarized, p-polarized, and s-polarized primary illumination light are elucidated. In addition, λ/2 retarder units 40 are provided behind each second prism of the polarization converter 50 in order to convert the respective polarization state A more detailed situation with respect to the optical paths within the multi-dichroic prism assembly 10 is shown FIGS. 9A and 9B.

Figure 4:
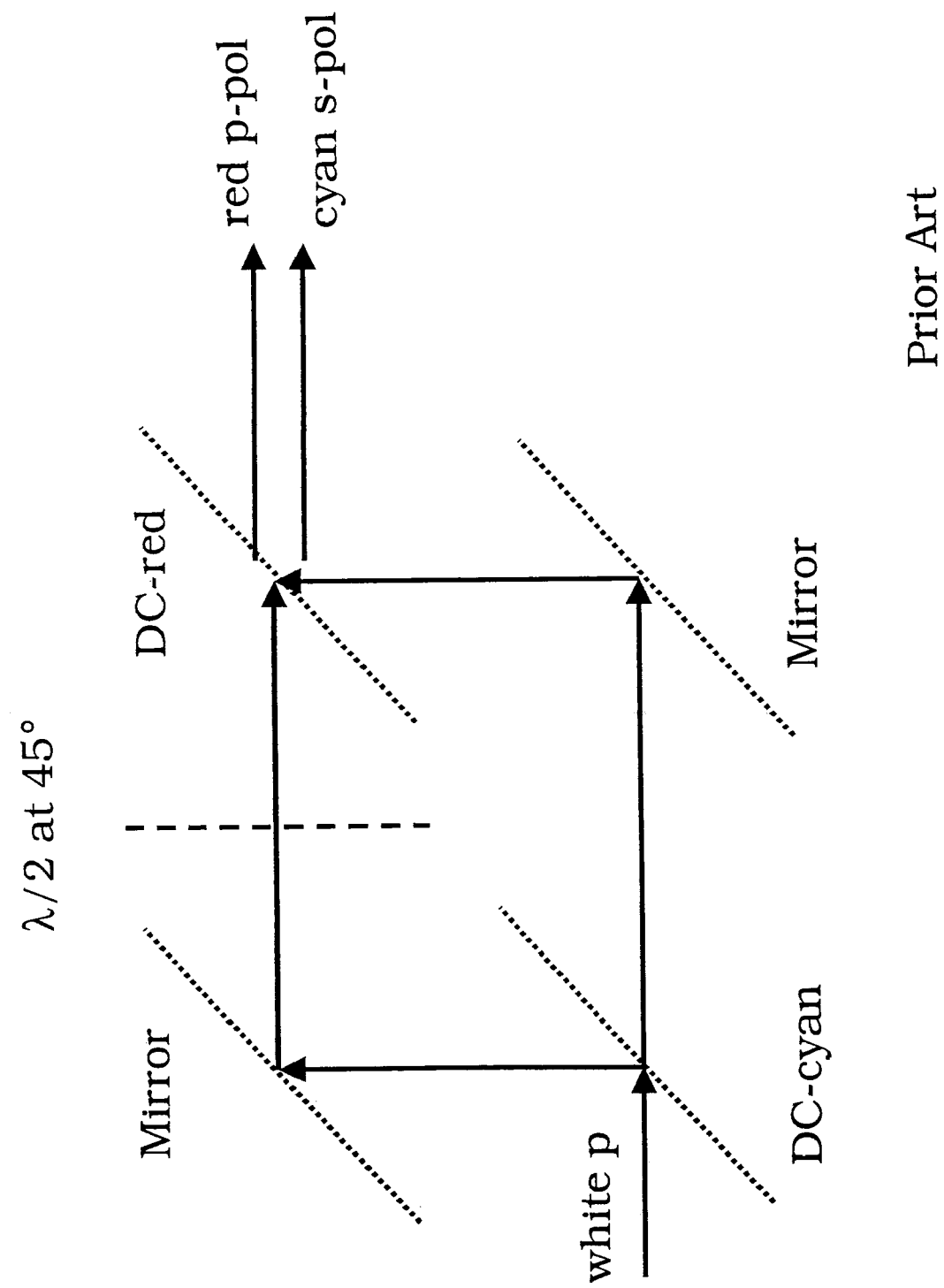

As already mentioned above FIG. 4 describe the optical paths for a prior art optical arrangement for achieving a comparable effect when compared to the present invention.

FIG. 5 therefore describes by means of a schematical and cross-sectional side view a prior art optical arrangement 1' having a prior art spectral processing sections 10' both of which are included in a prior art projection system having a comparable large optical extension.

Figure 6:
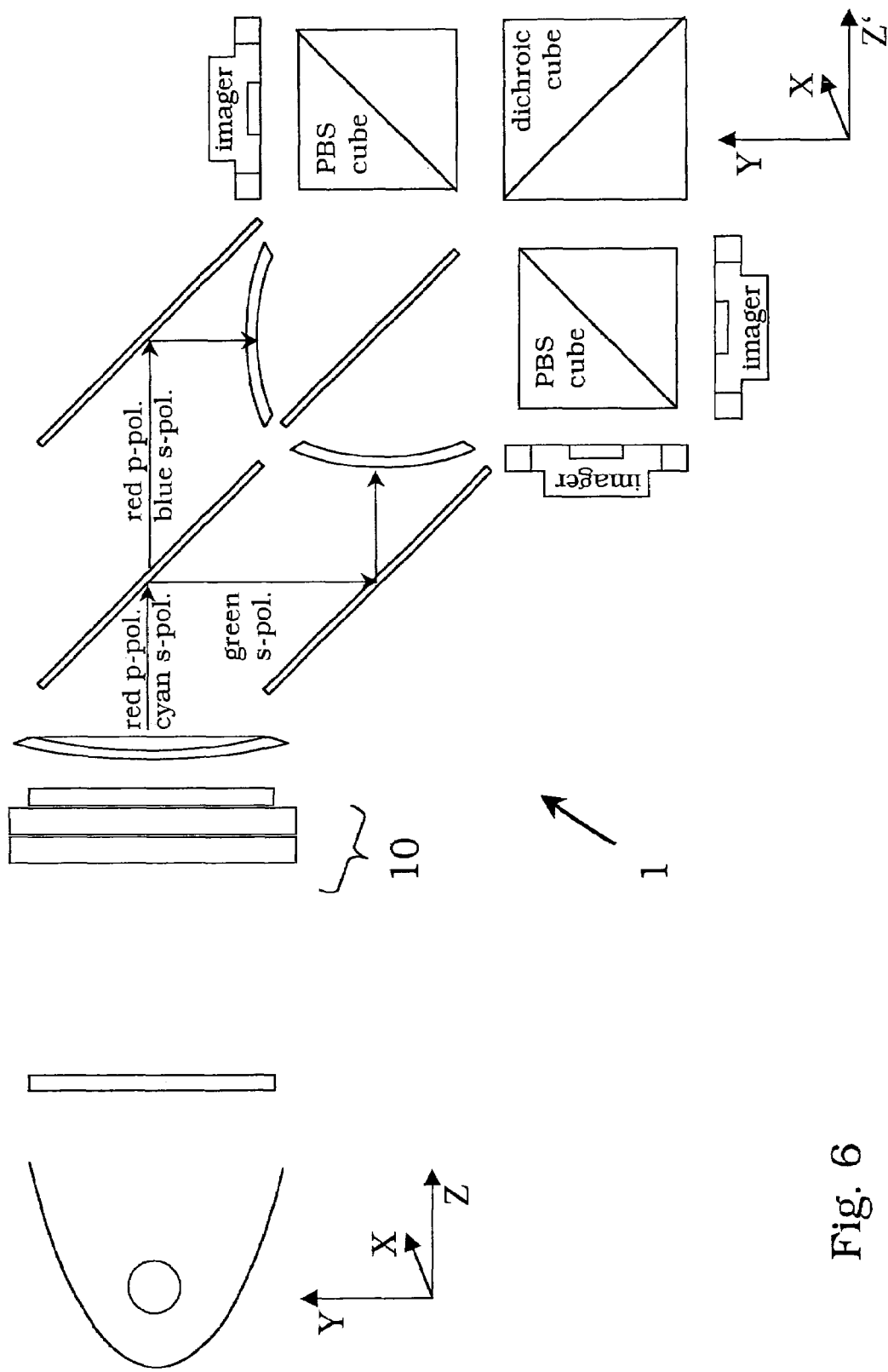
FIG. 6 is a cross-sectional side view of an illumination system using an embodiment of the present invention.

In direct comparison FIG. 6 demonstrates also by means of a schematical and cross-sectional side view an embodiment of the inventive optical arrangement 1 having as a spectral processing section P or 10 in an new projection system which when compared to FIG. 5 comprises a reduced optical extension as the spectral processing essentially takes place according to the inventive optical arrangement 1 and in particular according to the inventive multi-dichroic prism assembly 10.

FIGS. 7A to 7E demonstrate an assembly process in order to obtain a multi-dichroic prism assembly 10 according to the present invention. In accordance to FIG. 7A a first prism 21 of 90° triangular shape is provided having a first face 21-1, a second face 21-2 which form the secant faces of the prism as well as a diagonal or hypotenuse face 21d which forms a coating side for receiving and showing a dichroic mirror coating 30 in order to realize a spectral and/or polarization selective optical interface 22c. The provided second prism 22 also comprises a first face 22-1 and a second face 22-2 which form the secant faces of the prism. Additionally the second prism also comprises a diagonal or hypotenuse face 22d.

Figure 7:
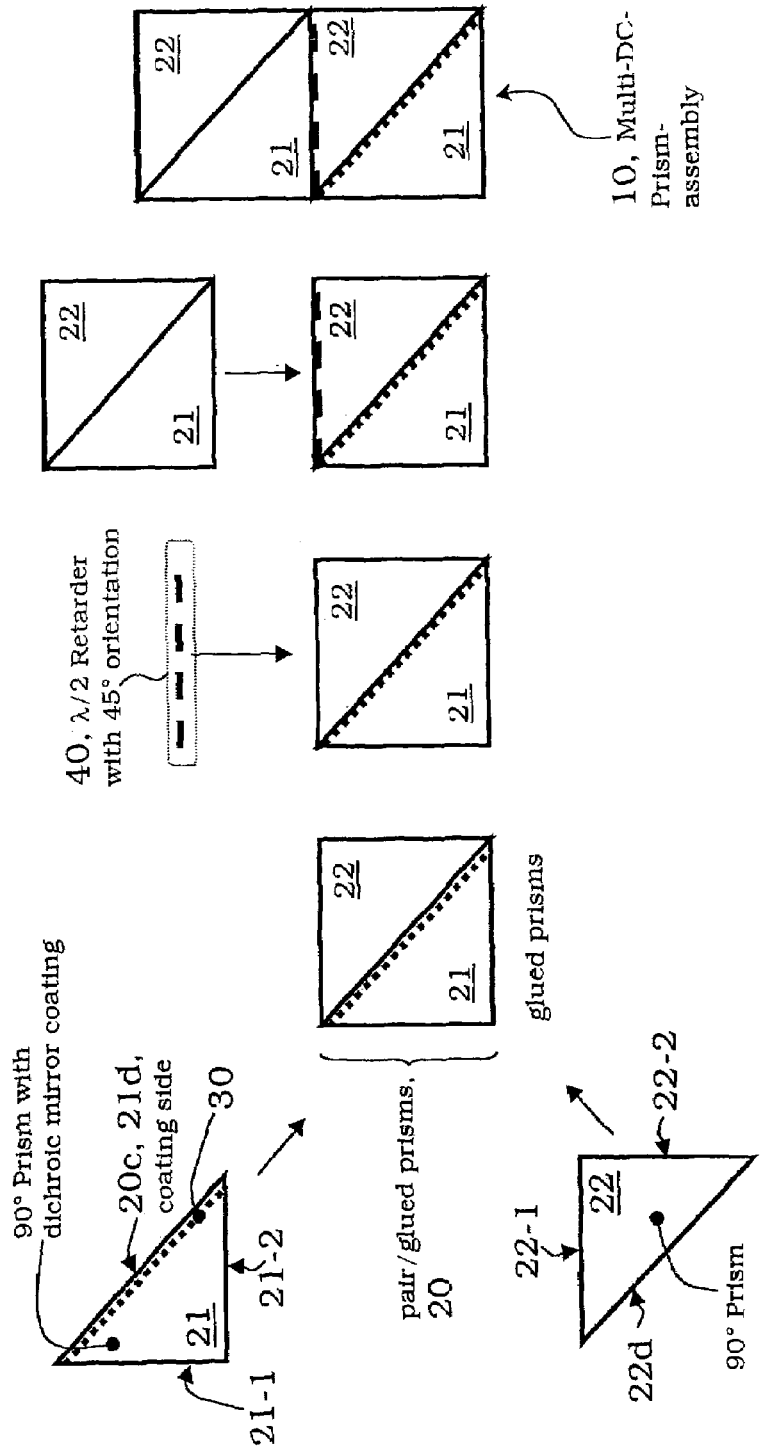

In FIG. 7B said first and second prisms 21 and 22, respectively, are glued together in order to form a pair 20 of said first and second prism 21 and 22, respectively. In FIG. 7C a λ/2-retarder with an 45° orientation and denoted by 40 is provided in order to be arranged and positioned on the first face 22-1 of the second prism 22. Then in accordance to FIG.

7D a further pair 20 of glued first and second prisms 21 and 22 is provided and in accordance to FIG. 7E fixed onto said first pair 20 of glued together first and second prisms 21 and 22. This is done in a way that the provided λ/2-retarder 40 is situated between the first face of a second prism of a first pair 20 and the second face 21-2 of a first prism 21 of a second pair 20. In operation of the inventive optical arrangement 1 the provided λ/2-retarder 40 acts in order to change the polarization state of inciting light from a s-polarization to a p-polarization and vice versa.

FIG. 8 is a schematical block diagram elucidating the global structure of the inventive optical arrangement 1 having a light entrance section E with a light entrance face E', a light output section O with an light output face O' and with the inventive spectral processing section P there between for receiving primary illumination light L1 from an light incoming direction Z and for generating secondary illumination light L2 which is irradiated and output essentially into a radiating direction Z' which is in this case essentially identical to said light incoming direction Z.

FIG. 9A explains in more detail by means of a cross-sectional and schematical side view the structure of the optical arrangement 1 by means of a multi-dichroic prism assembly 10 forming a spectral processing section P of the inventive optical arrangement 1. This is done on the basis of an multi-dichroic prism assembly 10 which has adjacent pairs 20 of first and second prisms 21 and 22. Each prism 21, 22 is of 90° triangular shape. Said first prism 21 comprises first and second secant faces 21-1 and 21-2 as well as any diagonal or hypotenuse face 21d. The same holds for said second prism 22 which comprises first and second secant faces 22-1 and 22-2 as well as a diagonal or hypotenuse face 22d. Between the hypotenuse or diagonal faces 21d and 22d of said first and of said second prisms 21 and 22, respectively, a dichroic coating or dichroic mirror 30 is formed in order to realize a spectral selective interface 20c between said first and said second prisms 21 and 22 respectively, of each pair 20 of prisms 21, 22.

Between adjacent pairs 20 of first and second prisms 20, 21 and 22 respectively, a λ/2-retarder element 40 may be situated in order to realize a polarization selective or polarization converting interface 40c between directly adjacent pairs 20 of first and second prisms 20, 21 and 22 respectively. As shown in FIG. 9A the first faces 21a of the first prisms 21 are oriented towards the light incoming direction Z. In addition, the second faces 22-2 of the second prisms 22 are oriented in the light output direction Z'.

FIG. 9B is similar to FIG. 9A and further elucidates the spectral decomposition realized by the present invention and in particular the decomposition of white light into red and cyan in a similar way as is shown in FIG. 3.

REFERENCE SYMBOLS

1 optical arrangement according to the present invention
1' optical arrangement of the prior art
10 multi-dichroic prism assembly of the present invention
10 multi-dichroic prism assembly of the prior art
20 pair of prisms 21, 22
20c interface, spectral separating face or interface
21 first prism
21-1 first face, first secant face
21-2 second face, second secant face
21-d third face, diagonal face, hypotenuse face
22 second prism
22-1 first face, first secant face
22-2 second face, second secant face
22-d third face, diagonal face, hypotenuse face
30 dichroic reflecting element, dichroic mirror
30c spectral separating interface
31 first lens array
32 second lens array
40 polarization changing element, polarization selective element, half wave retarder, λ/2 retarder
40c polarization changing face or interface, polarization selective face or interface
50 Polarization converting system
E light entrance/incidence/input section
E' light entrance/incidence/input face
L1 primary illumination light
L2 secondary illumination light
L2-1 first part or type of secondary illumination light
L2-2 second part or type of secondary illumination light
O light output/exit/irradiating section
O' light output/exit/irradiating face
P spectral processing section
SC1 first spectral component
SC2 second spectral component
X direction of extension
Y direction of extension
Z light incoming/input direction
Z' light output/irradiating direction

The invention claimed is:

1. Optical arrangement for pre-processing primary illumination light,
comprising:
a light entrance section (E) for receiving primary illumination light (L1) transmitted in and received from an incoming direction (Z),
a light output section (O) for outputting output light as secondary illumination light (L2) in an irradiating direction (Z'), and
a spectral processing section (P) arranged between said light entrance section (E) and said light output section (O) for spectrally processing said primary illumination light (L1) in order to generate said secondary illumination light (L2),
wherein said spectral processing section (P) comprises a multi-prism assembly including a plurality of sequentially connected prisms,
wherein pairs of adjacent and connected prisms form a respective spectral separating face at faces thereof forming a connecting interface between them, and
wherein said spectral separating face is arranged:
in order to perform a process of spectral separation with respect to said primary illumination light (L1),
in order to generate said secondary illumination light (L2), in order to thereby generate first and second parts of said secondary illumination light (L2)which have a pair of complementary spectral components of said primary illumination light, said pair if combined constituting a neutral color and which at the same time remain or are spatially mingled or spatially non-separated.

2. Optical arrangement according to claim 1,
wherein said plurality of prisms or a part thereof forms a receiving face (E') oriented towards said incoming direction (Z),
wherein said plurality of prisms or a part thereof forms a irradiating face (O') oriented in said irradiating direction (Z').

3. Optical arrangement according to claim 1,
wherein said pairs of adjacent and connected prisms form a cubic structure or a square structure.

4. Optical arrangement according to claim 1,
wherein a dichroic mirror is positioned between the prisms, thereby forming said spectral separating face,
wherein said dichroic mirror is adapted for reflecting light having a first spectral waveband,
wherein said dichroic mirror is adapted for transmitting light having a second spectral waveband, and
wherein said second spectral waveband is complementary with respect to said first spectral waveband.

5. Optical arrangement according to claim 4,
comprising a λ/2-retarder with a 45° orientation between 1) a vibration direction of the polarization light of incident light on the λ/2-retarder and 2) a fast or slow axis of the λ/2-retarder, said λ/2-retarder being adapted for adapting a polarization state of said reflected light or of said transmitted light.

6. Optical arrangement according to claim 1,
wherein said prisms are of right triangular shape, and
wherein said spectral separating face is formed by hypotenuse faces of the two adjacent and connected prisms of a pair of prisms.

7. Optical arrangement according to claim 6,
wherein said λ/2-retarder is arranged on or adjacent to a secant face of said prism, and
wherein said secant face is oriented parallel with respect to said incoming direction (Z) and/or with respect to said irradiating direction (Z'), and
said first and second parts or types of said secondary illumination light (L2) separated with respect to their polarization state and having different or complementary polarizations states, including a first or s polarized polarization state and a second or p polarized polarization state, and at the same time to remain or to be spatially mingled or spatially non-separated.

8. Optical arrangement according to claim 1,
wherein said prisms are of a rhomboidal shape,
wherein a first pair of parallel faces of said prisms forms a 45° angle with respect to said incoming direction (Z),
wherein a second pair of parallel faces of said prisms is arranged in a direction (X, Y) perpendicular to said incoming direction (Z), and
wherein a dichroic mirror is arranged between faces of said first pair of parallel faces of said adjacent and connected prisms.

9. Optical arrangement according to claim 8,
wherein the face oriented towards said light output section (Z') of said second pair of parallel faces is coated with a λ/2-retarder with 45° orientation between 1) a vibration direction of polarization light of incident light of the λ/2-retarder and 2) a fast or slow axis of the λ/2-retarder.

10. Optical arrangement according to claim 1,
wherein a polarizing converting system is arranged between said light entrance section (E) and said spectral processing section (P).

11. Optical arrangement according to claim 1,
wherein a polarizing converting system is arranged between said spectral processing section (P) and said light output section (O).

12. Optical arrangement according to claim 1,
wherein said plurality of prisms and/or of said pairs of prisms of said multi-prism assembly or said multi-prism assembly itself or a part thereof is, comprises an arrangement which extends in one direction (X) which is perpendicular to said in-coming direction (Z).

13. Optical arrangement according to claim 1,
wherein said plurality of prisms and/or of said pairs of prisms of said multi-prism assembly or said multi-prism assembly itself or a part thereof is, comprises or forms an arrangement which extends in two directions (X, Y) which are perpendicular to said incoming direction (Z) and which are perpendicular with respect to each other.

14. Optical arrangement according to claim 1,
wherein in said pair of prisms a first prism is provided which is arranged in order to receive said primary illumination light (L1).

15. Optical arrangement according to claim 14,
wherein said first prism comprises a first face which is arranged in order to receive said primary illumination light (L1).

16. Optical arrangement according to claim 14,
wherein said first prism comprises a secant face which is arranged for having light off or within said first spectral waveband left said first prism towards an adjacent pair of prisms and further towards a second prism of said adjacent pair of prisms and further for entering the same through a first face of said second prism of said adjacent pair of the prisms.

17. Optical arrangement according to claim 14,
wherein said first prism comprises a third face which is arranged
in order to receive light off or within said first spectral waveband and to reflect said received light of said first spectral waveband from said first face to said secant face of said first prism, or
in order to reflect light of said second spectral waveband and to transmit said received light of said second spectral waveband from said first face to said third face of said first prism and further for entering the second prism of said pair of prisms through a third face thereof.

18. Optical arrangement according to claim 14,
wherein said first face of said first prism is oriented perpendicular with respect to said incoming direction (Z) as a secant face, or
wherein said secant face of said first prism is oriented in a direction parallel to said incoming direction (Z) has a secant face, or
wherein said third face of said first prism is a diagonal face connecting said first and secant faces of said first prism as a hypotenuse face.

19. Optical arrangement according to claim 1,
wherein in said pair of prisms a second prism is provided which is arranged in order to receive light off or within said first spectral waveband.

20. Optical arrangement according to claim 19,
wherein said second prism comprises a secant face which is arranged for having lights left said second prism in the irradiating direction (Z').

21. Optical arrangement according to claim 19,
wherein said second prism comprises a third face which is arranged
in order to receive light of or within said first spectral waveband and to reflect light of a p-polarized polarization state from said first face of said second prism to said secant face of said second prism, or
in order to transmit light of a s-polarized polarization state, or
in order to receive light of or within said second spectral waveband and to transmit the same to the secant face of said second prism.

22. Optical arrangement according to claim 19,
wherein said first face of said first prism is oriented in a direction parallel with respect to the irradiating direction (Z) as a secant face, and
wherein said secant face of said first prism is oriented perpendicular with respect to the irradiating direction (Z) as a secant face, and wherein said third face of said first prism is a diagonal face connecting said first and secant faces of said first prism as a hypotenuse face.

23. Optical arrangement according to claim 1,
wherein said second prism comprises a first face which is arranged in order to receive and having entered light of or within said first spectral waveband from an adjacent pair of prisms and further from a secant face of a first prism of said adjacent pair of prisms and which is oriented and parallel to said incoming direction or to said radiating direction (Z).

24. Optical arrangement, comprising:
a multi-prism assembly including
a plurality of sequentially connected prisms,
a plurality of dichroic mirrors which are positioned respectively between the prisms of a pair of prisms, thereby forming a spectral separating face, wherein each of said plurality of dichroic mirrors is adapted for reflecting light having a first spectral waveband and for transmitting light having a second spectral waveband, wherein said second spectral waveband is a complementary pair with respect to said first spectral waveband, said pair if combined constituting a neutral color,
said optical arrangement further comprising: a $\lambda/2$-retarder with 45° orientation between the vibration direction of the polarization light of the incident line and the fast or slow axis of the $\lambda/2$-retarder, said $\lambda/2$-retarder being adapted for adapting a polarization state of said reflected light or of said transmitted light, and
a polarizing converting system arranged before or after said multi-prism arrangement in a way to ensure that after passing said optical arrangement said light having said second spectral waveband has another polarization state than said light having said first spectral waveband.

* * * * *